Sept. 27, 1960  E. A. HENNINGSEN  2,954,087
SPIKE TOOTH HARROW WITH LEAF SPRING RELIEF STRUCTURE
Filed March 28, 1958
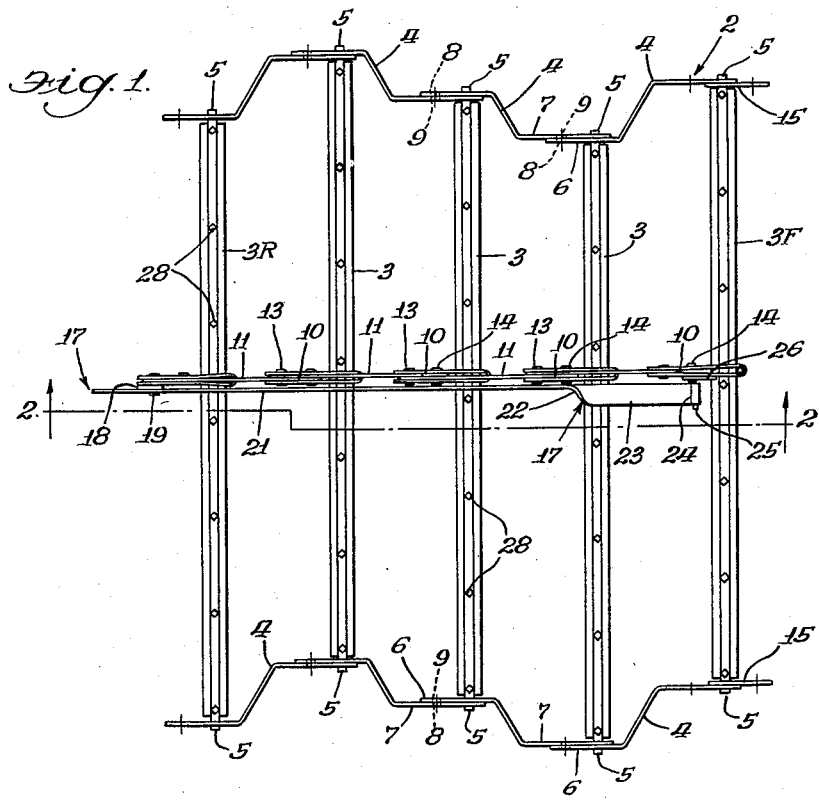
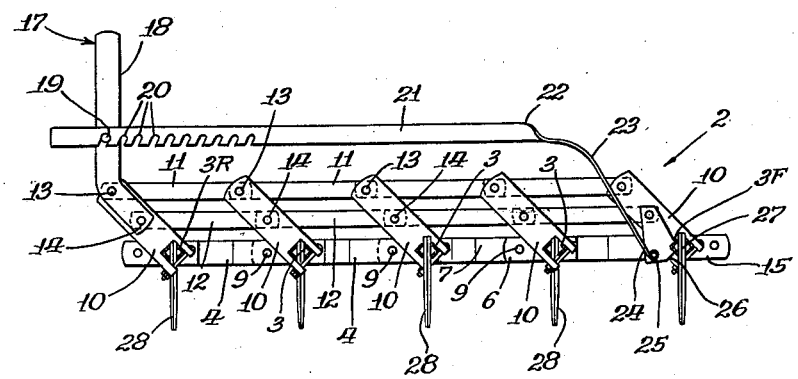
Inventor:
Ellar A. Henningsen
By: Paul O. Pippel
Atty United States Patent Office 2,954,087
Patented Sept. 27, 1960

2,954,087

SPIKE TOOTH HARROW WITH LEAF SPRING RELIEF STRUCTURE

Etlar A. Henningsen, Riverside, Ill., assignor to International Harvester Company, Chicago, Ill., a corporation of New Jersey Filed Mar. 28, 1958, Ser. No. 724,543

9 Claims. (Cl. 172—635)

This invention relates to earth working tools and more specially to peg tooth harrows.

A general object of the invention is to provide a novel peg tooth harrow wherein the structure for setting the teeth includes a resilient or flexible relief spring member which serves in the capacity of an adjusting member as well as a cushioning device for relieving loads on the teeth upon their striking an obstruction.

These and other objects of the invention will become more apparent from the specification and the drawings wherein:

Figure 1 is a plan view of the novel harrow incorporating the invention; and

Figure 2 is a longitudinal sectional view taken substantially on the line 2—2 of Figure 1.

Describing the invention in detail and having particular reference to the drawings there is shown a horrow generally designated 2 which includes a plurality of tooth bars 3 including a front tooth bar 3F and a rear tooth bar 3R. The tooth bars are disposed in generally parallel relationship transversely to the direction of operation of the device and the bars are interconnected by offset Z-shaped links 4 to which are pivoted the bars 3, 3F and 3R as at 5. It will be noted that the links 4 have rearward extensions 6 which overlap the forward portions 7 of the links rearwardly thereof and that the portions 6 and 7 have alignable openings 8 and 9 for the insertion of a pin for rigidifying the sides of the harrow. Thus the harrow may be either a rigid type or a flexible type and thus is known as a combination type in the implement art.

Each tooth bar is connected centrally thereof to the lower end of a diagonally upwardly and rearwardly extending lever arm 10 for swinging movement upon a generally horizontal axis with the related tooth bar and the tooth bars are interconnected by upper and lower parallelogram links 11 pivoted as at 13 to the upper ends of adjacent levers and the links 12 pivoted as at 14 to the adjacent levers intermediate the ends thereof.

It will be noted that the front bar 3F is pivotally connected to forwardly extending hitch members 15 which are adapted for connection in the usual manner to drawbar structure for connection to a draft unit such as a tractor or the like.

The feature of the present invention is the provision of a combination adjusting unit and shock absorbing structure generally designated at 17, such structure 17 including an upper set lever 18 which is connected to the lever arm 10 of the rear tooth bar 3R and the lever 18 is provided with a set pin 19 extending laterally from one side thereof intermediate its ends and this pin is adapted to enter into any of a series of downwardly and rearwardly inclined slots 20 in an adjusting member or bar 21. It will be noted from a consideration of Figure 2 that the member 21 extends generally horizontally fore and aft above the harrow unit and comprises a flat spring member which is disposed flatwise vertically and at its forward end 22 is twisted and provides a flexing section 23 which is curved on a broad radius and extends diagonally forwardly downwardly and is adapted to flex in bending. The portion 23 has a lower end 24 provided with an eye about which it is pivoted on a pin 25 on a generally horizontal axis to a bracket 26 at a point below the axis 27 of pivot of the front tooth bar 3F. This relationship is critical as well as the arrangement of the bar 21 and the portion 23.

In analyzing in general the forces involved, it is absolutely necessary to counterbalance these forces so that the tendency for the rear tooth bar 3R in such types of rakes to rise out of the ground is prevented. Considering that the harrow is being pulled forwardly all of the tooth bars tend to swing in a clockwise direction that is the teeth 28 on the tooth bars to swing rearwardly. Thus the lever arm or the lever 18 wants to swing forwardly and thus the bar 21 has a tendency to move forwardly. At the same time the pivot point 25 of the forward end of the spring member inasmuch as it is below the center of pivot point 27 tends to move forwardly and downwardly thus tending to lower the forward end 22 of the member 21. The member 21 is thus loaded in compression and the force tending to raise the rear end of the harrow are counteracted by the compression forces being imposed on the members 11 and 12 in view of the pivoting action at 25. Thus a novel balanced effect is achieved and the tendency is positively eliminated. For purposes of explanation it will be readily appreciated that if the point 25 were above the pivot point 27 that upon the forward tooth bar 3F swinging rearwardly that the pivot point 25 would then be moving forwardly and the action at the rear tooth bar 3R tending to move the same upwardly would be accentuated.

It will be noted that if the tooth bars should strike an obstruction that the link 21 will flex in its portion 23 thus providing a cushioning effect.

What is claimed is:

1. A harrow comprising front and rear tooth bars and intermediate tooth bars, means pivotally interconnecting said tooth bars in fore and aft spaced relationship, a parallelogram linkage operatively interconnecting said tooth bars for conjunctive swinging movement, each of said tooth bars comprising a plurality of depending earth penetrating teeth, and means for setting said tooth bars with the teeth thereof at different working angles, said last mentioned means including a relief structure accommodating yieldable swinging movement of said tooth bars upon the teeth striking an obstruction, said structure having a spring member operatively connected to the front bar for biasing the same with a force in a direction toward said rear bar during operation of the harrow and means pivotally adjustably connecting said spring member with said rear bar for biasing the same toward the front bar with a force in neutralizing opposition to said first-mentioned force.

2. In a harrow comprising a plurality of pivotally interconnected transversely extending tooth bars including a front and a rear tooth bar, means for setting the working angle of said tooth bars including a leaf spring member extending fore and aft transversely of said tooth bars, means adjustably interconnecting said member at one point with the rear bar, said member extending horizontally and having a forward end portion turned downwardly and forwardly and having a lower end pivotally connected to said front tooth bar at another point disposed eccentrically of the axis of pivot of the front tooth bar, said points disposed in opposition loading to said member.

3. The combination according to claim 2 and said other point of pivot being located below and rearwardly of the axis of pivot of said front tooth bar.

4. A harrow comprising a plurality of tooth bars including front and rear tooth bars, means pivotally mounting said tooth bars at a predetermined relationship to each other, and means for adjusting the working angles of said tooth bars comprising linkage interconnecting all of said tooth bars, and combination cushioning and adjusting structure operably associated with said tooth bars and comprising a member having a fore and aft extending portion, means connected to said rear tooth bar and swingable terewith for adjusting the position of said tooth bars attendant to adjusting movement with respect to said adjusting member and having a point of pivot to said portion, said member having a flexible portion pivotally connected to said front tooth bar at a point rearwardly and below the axis of pivot of said forward tooth bar and in opposition loading to said point of pivot of said portion.

5. A harrow comprising a plurality of tooth bars including front and rear tooth bars, means pivotally mounting said tooth bars, means operatively interconnecting said tooth bars for swinging movement in unison for changing the working angle of said tooth bars with respect to the ground, and means for adjustably holding said tooth bars in a plurality of working positions and comprising a member adjustably connected to said rear tooth bar, said member having a fore and aft extending portion operatively connected to said front tooth bar at a point developing beam compresssion loading between the same and said rear tooth bar.

6. A harrow comprising a plurality of transversely extending tooth bars spaced in a fore and aft direction, means pivotally mounting said tooth bars in said relationship, each tooth bar comprising an upwardly extending arm, individual upper and lower links operably interconnecting the arms of adjacent tooth bars in a parallelogram arrangement, one of said tooth bars comprising a lever connected and extending upwardly from the arm thereof, a transverse pin mounted on the lever, a generally horizontally extending member having a portion with a series of downwardly facing notches engaged with said pin, said member having a downwardly curved portion terminating in a lower end adjacent to another tooth bar spaced from said one tooth bar and pivotally connected to said other tooth bar at a point eccentric of its axis of pivot, said downwardly extending portion being a leaf spring.

7. A harrow comprising front, rear and intermediate tooth bars, means pivotally interconnecting said tooth bars in fore and aft generally parallel spaced relationship, an arm connected to each tooth bar and extending upwardly therefrom, a pair of generally horizontal links pivotally interconnecting the arms of adjacent tooth bars, said rear tooth bar having an upstanding lever connected thereto, a leaf spring member extending in a fore and aft direction and having a rear portion adjustable lengthwise with respect to said lever attendant to the latter swinging forwardly or rearwardly with attendant swinging and adjustment to the tooth bars, means releasably interconnecting the lever and leaf spring member, said leaf spring member being flat vertically from its rear end to adjacent its forward end and being twisted adjacent to its forward end and extending flatwise transversely of the harrow and curved downwardly and terminating in a lower pivot end, and means pivotally connecting said lower pivot end with said front tooth bar at a point rearwardly and below the axis of pivot of said front tooth bar.

8. A harrow having front and rear ends and tooth bars between said ends, said tooth bars pivotally mounted on generally horizontal axes, means interconnecting said tooth bars for conjunctive movement for setting the tooth bars at different working positions about said axes, and structure operably associated with said last mentioned means for selectively holding said tooth bars at various positions and including means connected to one of said tooth bars above its axis of pivot and to another of said tooth bars forwardly of said one bar at a point rearwardly and below the axis of pivot of the latter, said means disposed in compression loading between said connections to respective tooth bars.

9. A harrow comprising a plurality of transversely extending tooth bars spaced in fore and aft relationship, frame means pivotally mounting said bars in said relationship, means operatively interconnecting said bars for conjunctive movement to a plurality of working positions, cushioning means operatively interconnected between two of said bars and including a leaf spring extending therebetween, and said leaf spring having one end pivotally connected to one of said tooth bars at a point below and eccentrically of the axis of pivot thereof and with the other bar at a point upwardly of the axis of pivot thereof.

References Cited in the file of this patent

UNITED STATES PATENTS

| | | |
|---|---|---|
| 182,914 | Gillelan | Oct. 3, 1876 |
| 448,446 | Mackey | Mar. 17, 1891 |
| 587,011 | Marshall | July 27, 1897 |
| 2,321,663 | Donovan | June 15, 1943 |
| 2,429,013 | Barrentine | Oct. 14, 1947 |